S. SVENSON.
BAIT HOLDER FOR FISHHOOKS.
APPLICATION FILED OCT. 27, 1919.

1,388,386.

Patented Aug. 23, 1921.

UNITED STATES PATENT OFFICE.

SVEN SVENSON, OF LA CROSSE, WISCONSIN.

BAIT-HOLDER FOR FISHHOOKS.

1,388,386.   Specification of Letters Patent.   Patented Aug. 23, 1921.

Application filed October 27, 1919. Serial No. 333,672.

*To all whom it may concern:*

Be it known that I, SVEN SVENSON, a citizen of the United States, residing at La Crosse, in the county of La Crosse and State of Wisconsin, have invented certain new and useful Improvements in Bait-Holders for Fishhooks, of which the following is a specification.

This invention has reference in general to fish hooks, and the primary object is to provide an improved bait holder therefor, constructed in such simple and novel manner as to hold a live bait, especially a minnow, in an effective relation to the hook and without interfering with the normal and natural action of the minnow or other bait in the water.

Another object resides in the provision of a bait holder of the character described which does not mutilate or pierce the bait. From a humane view point this is especially desirable, making it simple and easy for women, estheticians, to bait a hook, where heretofore this has often been the cause of objecting to fishing.

In furtherance of these general objects, my invention contemplates the provision of a pair of clamping members having shanks terminating in headed gripping portions, the shanks being secured to the line-attaching end of a hook with the headed portions in proximity to the barbed hook, and the provision of a member embracing and slidable lengthwise on said shanks for drawing the headed members together and clamping them onto a fin, preferably the dorsal fin of a fish. By reason of this arrangement the fish is suspended within the bend of the hook and its action in the water is perfectly free and normal.

Other objects and attendant advantages will be appreciated as the invention becomes better understood by reference to the following description when considered in connection with the accompanying drawing, in which—

Figure 1:
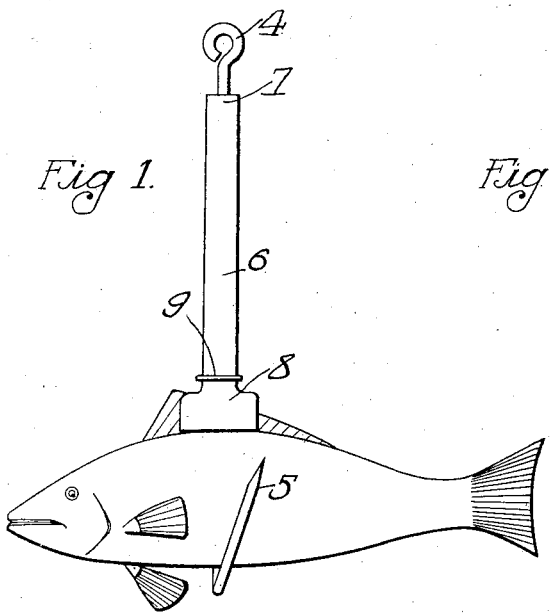
Figure 2:
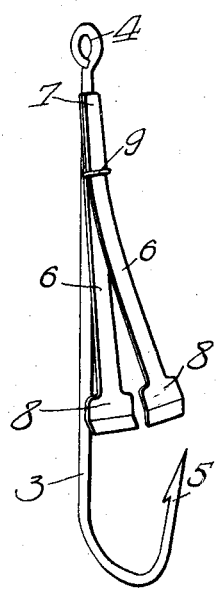

Figure 1 is a view illustrating my improved bait holder and hook, and a minnow held thereby, the drawing being somewhat enlarged for purpose of clarity; and Fig. 2, a perspective of the bait holder and hook.

As mentioned above, my invention contemplates and is undoubtedly best suited to the holding of a live minnow within the hook point by gripping only the dorsal fin, which is relatively strong and well suited for this purpose. It should be understood, however, that my improvements are in no way limited to holding bait of this kind, as it is equally well adapted for holding other live bait, such as crickets, grasshoppers, frogs, etc., as will be appreciated by anyone skilled in this art.

The hook *per se* might be of any suitable or preferred construction, and in the present case, I have illustrated a hook 3 of conventional form, having a line-attaching end 4 and a barbed point 5. My improvements in their preferred form consist of a pair of clamping members having elongated shanks 6, preferably formed of sheet spring steel or any suitable material and rigidly secured at 7 by welding or otherwise, to the hook shank adjacent to the line-attaching end thereof. The opposite ends of the shank 6 are widened, providing gripping heads 8, the ends of which are preferably turned in, as shown, so as to provide most effective gripping edges extending transversely of the shank 6. It is preferred that these gripping heads 8 shall be disposed in such proximity to the hook point as to hold the bait suspended within and partially supported (if desired) by the bend of the hook. Means is now provided for drawing the gripping heads 8 together onto the interposed bait and for clamping and holding said heads in operative position. This means may consist, as shown, of a ring 9 embracing and slidable lengthwise on the shanks 6 so as to permit, when the ring is in its uppermost position, shown in Fig. 2, ample separation of the ends 8, and when drawn down to the position shown in Fig. 1, to firmly clamp said ends 8 and the interposed bait together.

In the illustration shown in Fig. 1, a minnow is held by the dorsal fin, and it will be manifest that this in no way interferes with life and free action of the minnow in the water. Consequently, a very effective and practical live bait holder is produced. It will be further evident that there is nothing objectionable to baiting a hook of this character, since the bait-holding means does not mutilate or pierce the bait, and yet the latter is held very effectively in the desired relation to the hook point. In the example illustrated, the dorsal fin of a fish is unusually strong and affords a most effective place of attachment and permits of such secure hold as to be entirely practical and suitable for casting. It should be understood, however, that my improvements are equally well adapted for holding other kinds of bait, since the heads 8 are separable sufficiently therefor, and are adapted for gripping and holding the bait in any of various degrees of separation. This is permitted by reason of the fact that the ring member 9 may be drawn down to sufficient tightness irrespective of whether the bait interposed between the members 8 is bulky or quite narrow, as in the case of attachment to a fin.

It is believed that the foregoing conveys a clear understanding of the objects prefaced above, and while I have illustrated and described but a single working embodiment thereof, various changes might be made in details of construction without departing from the spirit and scope of the invention as expressed in the appended claim, in which:

I claim:

A bait holder comprising, in combination with a barbed hook, a pair of elongated resilient shanks, fixedly secured at one end to the eyelet end of the hook, the separated ends of the shanks disposed in proximity to the hook and terminating in transversely widened, relatively flat gripping heads shaped to grip without mutilation, the interposed fin or other part of the bait disposed within and extending crosswise of the hooked arch, and a member embracing and slidable lengthwise on said shanks for drawing the heads together so as to clamp and securely hold the bait.

SVEN SVENSON.

Witnesses:
SIDNEY Y. SHOOP,
DELLA ATKINSON.